US008388447B2

(12) United States Patent
Shimura et al.

(10) Patent No.: US 8,388,447 B2
(45) Date of Patent: Mar. 5, 2013

(54) SYSTEMS, METHODS AND TECHNIQUES FOR SAFELY AND EFFECTIVELY COORDINATING VIDEO GAME PLAY CONTESTS BOTH ON AND OFF LINE

(75) Inventors: Yukimi Shimura, Kyoto (JP); Wing Cho, Kyoto (JP); Akiya Sakamoto, Kyoto (JP); Yoshihito Ikebata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/067,613

(22) Filed: Jun. 14, 2011

(65) Prior Publication Data

US 2011/0319170 A1 Dec. 29, 2011

Related U.S. Application Data

(60) Provisional application No. 61/344,220, filed on Jun. 14, 2010.

(51) Int. Cl.
*A63F 9/24* (2006.01)

(52) U.S. Cl. ............................................ 463/42; 463/25

(58) Field of Classification Search ............... 463/25–42
See application file for complete search history.

(56) References Cited

U.S. PATENT DOCUMENTS

| 2007/0265095 A1* | 11/2007 | Jonishi ............................. 463/42 |
| 2008/0009344 A1* | 1/2008 | Graham et al. ................. 463/25 |
| 2008/0132336 A1* | 6/2008 | Kobayashi et al. ............. 463/42 |
| 2010/0022308 A1* | 1/2010 | Hartmann et al. .............. 463/42 |

OTHER PUBLICATIONS

NPL line rider iride iphone app dated Sep. 26, 2008.*

* cited by examiner

*Primary Examiner* — Masud Ahmed
(74) *Attorney, Agent, or Firm* — Nixon & Vanderhye PC

(57) ABSTRACT

A game involves establishing a Wi-Fi connection for retrieving a template used to create a level for the game. A play test is conducted to determine if the created level of the game can be played. The created game level can be shared with other players and/or submitted as a contest for play and competition judging by other players.

10 Claims, 8 Drawing Sheets

SYSTEMS, METHODS AND TECHNIQUES FOR SAFELY AND EFFECTIVELY COORDINATING VIDEO GAME PLAY CONTESTS BOTH ON AND OFF LINE

CROSS REFERENCE TO RELATED APPLICATIONS

This application claims priority to U.S. Provisional Application No. 61/344,220, filed Jun. 14, 2010, is incorporated herein by reference in its entirety.

FIELD

The technology herein relates to networked gaming, and more particularly to systems, methods and techniques for coordinating online and offline contests for multiple networked electronic devices and/or other users.

BACKGROUND AND SUMMARY

Within the last decade, computerized gaming, computer graphics and electronic networking have revolutionized remote networked game play. The Internet, cellular communications networks, and wireless communications networks such as WI-FI have opened exciting new possibilities for networked multiplayer gaming. If one desires the competitiveness of a multiplayer game and it isn't practical or possible to invite friends over, it's now possible to connect to a network and use the network to carry game play signaling between different gaming or other appliances. A child can now operate a handheld gaming platform at a kitchen table or in a fast food restaurant and interact wirelessly in real time with another player across town, across the country or on the other side of the globe. One can play against friends, neighbors, acquaintances or people one hasn't yet met. Contests are also possible.

Further exemplary illustrative non-limiting features and advantages of an exemplary illustrative non-limiting implementation involve providing contest templates through Wi-Fi or other wireless or wired connections wherein users submit their own creations of game contest levels, evaluate each others creations, and see auto-calculated results. This new system can provide the following services:

Updating information by using Newsfeed.
Provide templates specific to certain rules and restrictions available on the server for users to build their user driven contest (UDC) level from.
Maintain server.
Monitor/patrol all activities for security reasons.
Remove any items not suitable to share with public audience.

Users will enjoy this Wi-Fi social event by uploading their own created game contest levels and downloading game contest levels of others and evaluating the results. Evaluation results will be automatically calculated and winners of the contest will be posted on under the "contest" section of the game.

By selecting the Construction Zone Menu of the game, the user is provided with a quick tutorial series on how to build levels by actual hands on experience. Once the tutorial series is completed, users are allowed to create their own levels using downloaded game templates.

A created game level can be saved, play tested, reset to its initial state, or exited without saving. Saved game levels can be shared with other players.

In a Challenge Mode, a user can create a custom level based on a particular theme and/or rules and submit it to an online competition judged by other players. Play levels created by other users can be downloaded by the user and judged once. The judging results for any submitted level can be accessed online.

BRIEF DESCRIPTION OF THE DRAWINGS

These and further aspects of the exemplary illustrative non-limiting implementations will be better understood in light of the following detailed description of illustrative exemplary non-limiting implementations in conjunction with the drawings, of which.

DETAILED DESCRIPTION

Figure 1:
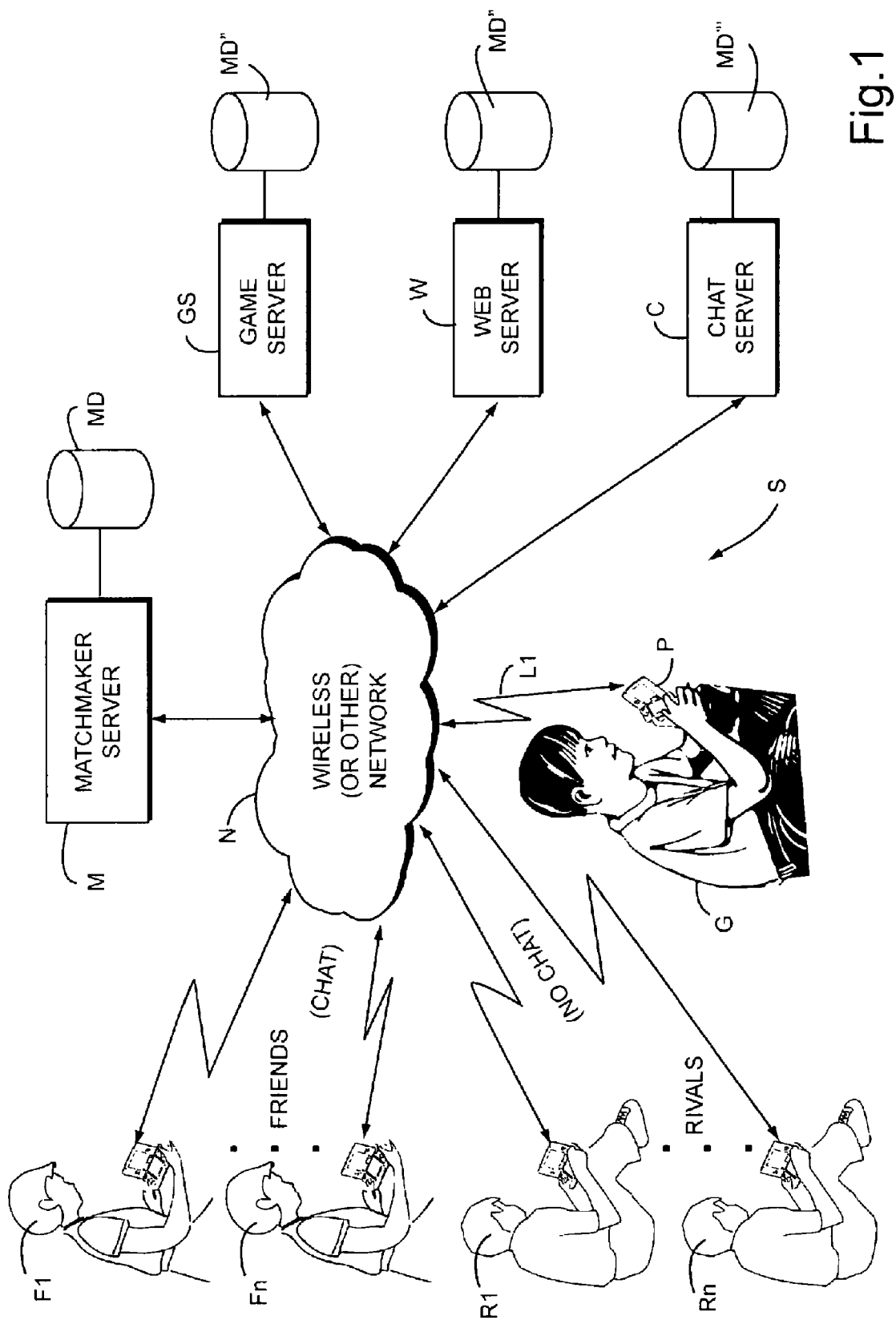
FIG. 1 shows an exemplary illustrative non-limiting implementation of an overall networked gaming system.

FIG. 1 shows an exemplary illustrative non-limiting implementation of a networked gaming system S. In the exemplary illustrative non-limiting system S, a gamer G plays a video game or runs another networked application on a networked gaming or other platform P. Platform P can be for example a Nintendo DS portable handheld wireless gaming platform, the Nintendo Revolution platform, or any other gaming or other networked platform capable of playing a game or providing other application(s).

Gaming platform P connects via a wireless or wired link L1 to a network N. Network N can be for example the Internet, an 802.11 wireless "WI-FI" network in the ad hoc or infrastructure mode, a cellular telephone network, a local area network, a wide area network, or any other network capable of communicating information between devices. Platform P uses the network to allow gamer G to play multi-player games against other garners F1 ... FN, R1 ... RN who may be remotely located. These other garners can be located across the room, across town or across the world.

As further shown in FIG. 1, servers such as a matchmaker server M, a game server GS, a web server W and a chat server C are coupled directly or indirectly to network N. Gaming platforms P, F1 ... FN, R1 ... RN can communicate with these various servers M, GS and W via network N. In the exemplary illustrative implementation, each of servers includes a mass storage device MD for securely storing information concerning the identities and other information about users of gaming platforms P, F1 . . . FN, R1 . . . RN.

Matchmaker server M (which may be a conventional server and associated software provided by Game Spy) matches up video game players based on skill level, previous game statistics, geographical location, or any of a variety of other characteristics, and may keep track of player status information such as which players are online and which ones are not, which online players are already engaged in playing a game and which ones are waiting to play, which "ready room" each player inhabits waiting to play a game with others in the same virtual "ready room", and other functionality.

Web server W (which may be coupled to matchmaker server M) can allow gamers to access certain types of status information about other players via a conventional web browser launched on gaming platforms P or other appliances having embedded or other web browser functionality.

Game Server GS may provide game downloads or other information downloads.

Chat server C may provide facilities to allow certain garners to "chat" (communicate) via text messaging, voice messaging, video messaging, or other messaging.

In the exemplary illustrative non-limiting system S shown, the gamer G operating gaming platform P can play a multi-player game over network N with (at least) two different categories of other gamers: "Friends"F1 . . . FN or "Rivals" R1 . . . RN. In the exemplary illustrative non-limiting example, a "Friend" is someone the gamer G knows personally. A "Rival" is someone the gamer G does not know personally but perhaps has "met" online (e.g., by being matched up by matchmaker server M with that person to play a game previously) and which the gamer G wants to keep track of for future game play.

In the exemplary illustrative non-limiting implementation, system S maintains different lists or rosters for Friends and Rivals, and handles each of those lists or rosters differently while allowing gamer G to selectively play games against Friends, Rivals or both. Additional or different categories of opponents can be provided if desired.

Exemplary Illustrative Non-limiting Gaming Platform

Figure 2A:
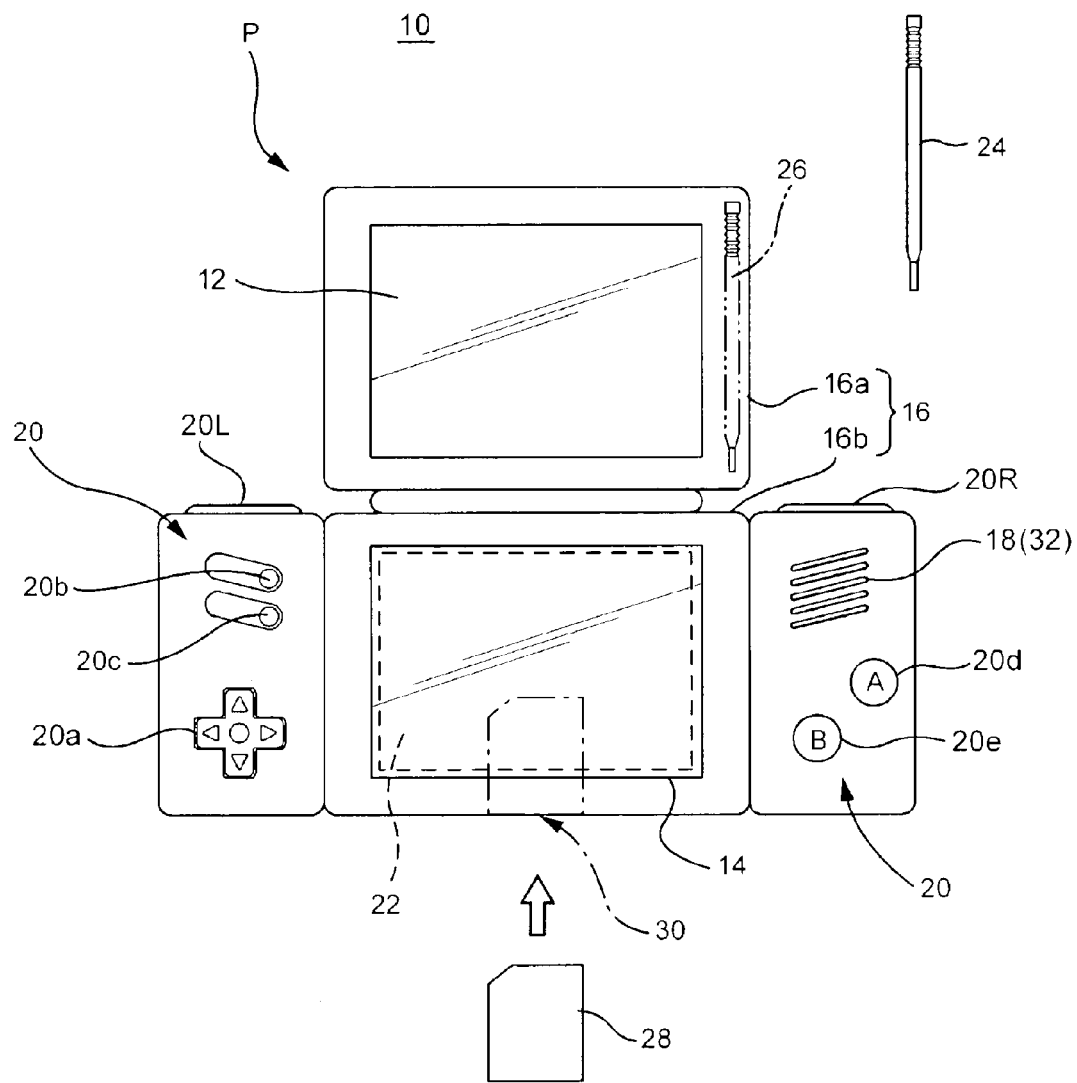
FIG. 2A shows an exemplary illustrative non-limiting game device including a first liquid crystal display and a second liquid crystal display.

Referring to FIG. 2A, a game device P of one exemplary illustrative non-limiting implementation includes a first liquid crystal display (LCD) 12 and a second LCD 14. The LCD 12 and the LCD 14 are provided on a housing 16 so as to be arranged in a predetermined position. In this implementation, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is used as a display in this implementation, an EL (Electro-Luminescence) display or a plasma display may be used in place of the LCD. Alternatively, a CRT display may be used for game consoles, arcade video game machines, etc.

As can be understood from FIG. 2A, the upper housing 16a has a planar shape a little larger than a planar shape of the LCD 12, and has an opening formed so as to expose a display surface of the LCD 12 from one main surface thereof. The lower housing 16b has a planar shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged. The upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. The switches 20d and 20e are placed at the right of the LCD 14 on the one main surface of the lower housing 16b. Switches 20L and 20R are placed in a part of an upper edge (top surface) of the lower housing 16b and lie on each side of the connected portion with the upper housing 16a.

The direction instructing switch 20a functions as a digital joystick, and is used for instructing a moving direction of a player character (or player object) to be operated by a player, instructing a moving direction of a cursor, and so forth by operating any one of four depression portions. The start switch 20b is formed by a push button, and is used for starting (restarting) a game, temporarily stopping (pausing) a game, and so forth. The select switch 20c is formed by the push button, and used for a game mode selection, etc.

The action switch 20d (that is, the A button) is formed by the push button, and allows the player character to perform an action that is game specific. For example, it may be used for instructing character movement direction, such as hitting (punching), throwing, holding (obtaining), riding, jumping, etc. For example, in an action game, it is possible to apply an instruction of jumping, punching, moving arms, etc. In a role-playing game (RPG) or a simulation RPG, it is possible to apply an instruction of obtaining an item, selecting and determining acts or commands, etc. The action switch 20e (that is, the B button) is provided by a push button, and is used for changing a game mode selected by the select switch 20c, canceling an action determined by the A button 20d, and so forth.

The action switch (left depression button) 20L and the action switch (right depression button) 20R are formed by a push button. The left depression button (L button) 20L and the right depression button (R button) 20R can perform the same operation as the A button 20d and the B button 20e, and also function as a subsidiary of the A button 20d and the B button 20e.

A touch panel 22 is provided on a top surface of the LCD 14. As the touch panel 22, any type of a resistance film system, an optical system (infrared rays system) or an electrostatic capacitive coupling system, for example, can be used. In response to an operation of depressing, stroking or touching with a stick 24, a pen (stylus pen), or a finger (hereinafter, referred to as "stick 24, etc.") on a top surface (detection surface) of the touch panel 22, the touch panel 22 detects coordinates of operating position of the stick 24, etc. and outputs coordinate data corresponding to the detected coordinates.

According to this implementation, the exemplary non-limiting resolution of the display surface of the LCD 14 is 256 dots×192 dots, and a detection accuracy of a detection surface of the touch panel 22 is also rendered 256 dots×192 dots in correspondence to the resolution of the display surface (this is the same or approximately the same as for the LCD 12). Detection accuracy of the detection surface of the touch panel 22, however, may be lower than the resolution of the display surface of the LCD 14, or higher than it. In the detected coordinates of the touch panel 22, a point of origin (0, 0) is on an upper left corner, a right horizontal direction is an X-axis normal direction and a downward vertical direction is a Y-axis normal direction (the same applies to the coordinate system of the LCD 14 (12)). A three-dimensional game space often has X and Y coordinates on the horizontal plane and a Z axis in a vertical direction.

It is possible to display different game images (game screens) on the LCD 12 and the LCD 14. This allows the player to point at (specify) or make active (move) character images displayed on the screen of the LCD 14, such as player characters, enemy characters, item characters, text information and icons, or select a command, by operating the touch panel 22 with the stick 24, etc. This also makes it possible to change an orientation of a virtual camera (viewpoint) provided in the three-dimensional game space or scroll through a game screen (the screen is displayed in a state of being gradually moved).

As stated above, the game device 10 has the LCD 12 and the LCD 14 as a display portion of two screens, and by providing the touch panel 22 on an upper surface of any one of them (LCD 14 in the first embodiment), the game device 10 has the two screens (LCD 12, 14) and the two operating portions (20, 22).

Additionally, in this implementation, the stick 24 can be inserted into a housing portion (housing slot) 26 provided in proximity to a side surface (right side surface) of the upper housing 16a, for example, and taken out therefrom as necessary. In a case of providing no stick 24, it is not necessary to provide the housing portion 26.

The game device 10 further includes a memory card (or game cartridge) 28. The memory card 28 is detachable, and inserted into a loading slot 30 provided on a rear surface or a lower edge (bottom surface) of the lower housing 16b. Although omitted in FIG. 2A, a connector 46 (see FIG. 2B) is provided at a depth portion of the loading slot 30 for connecting a connector (not shown) provided at an end portion of the memory card 28 in the loading direction. When the memory card 28 is loaded into the loading slot 30, the connectors are connected with each other, and therefore, the memory card 28 is accessible by a CPU core 42 (see FIG. 2B) of the game device 10.

A speaker 32 (see FIG. 2B) is provided at a position corresponding to the sound hole 18 inside the lower housing 16b. A battery accommodating box is provided on a rear surface of the lower housing 16b, and a power switch, a volume switch, an external expansion connector, an earphone jack, etc. are provided on a bottom surface of the lower housing 16b.

Figure 2B:
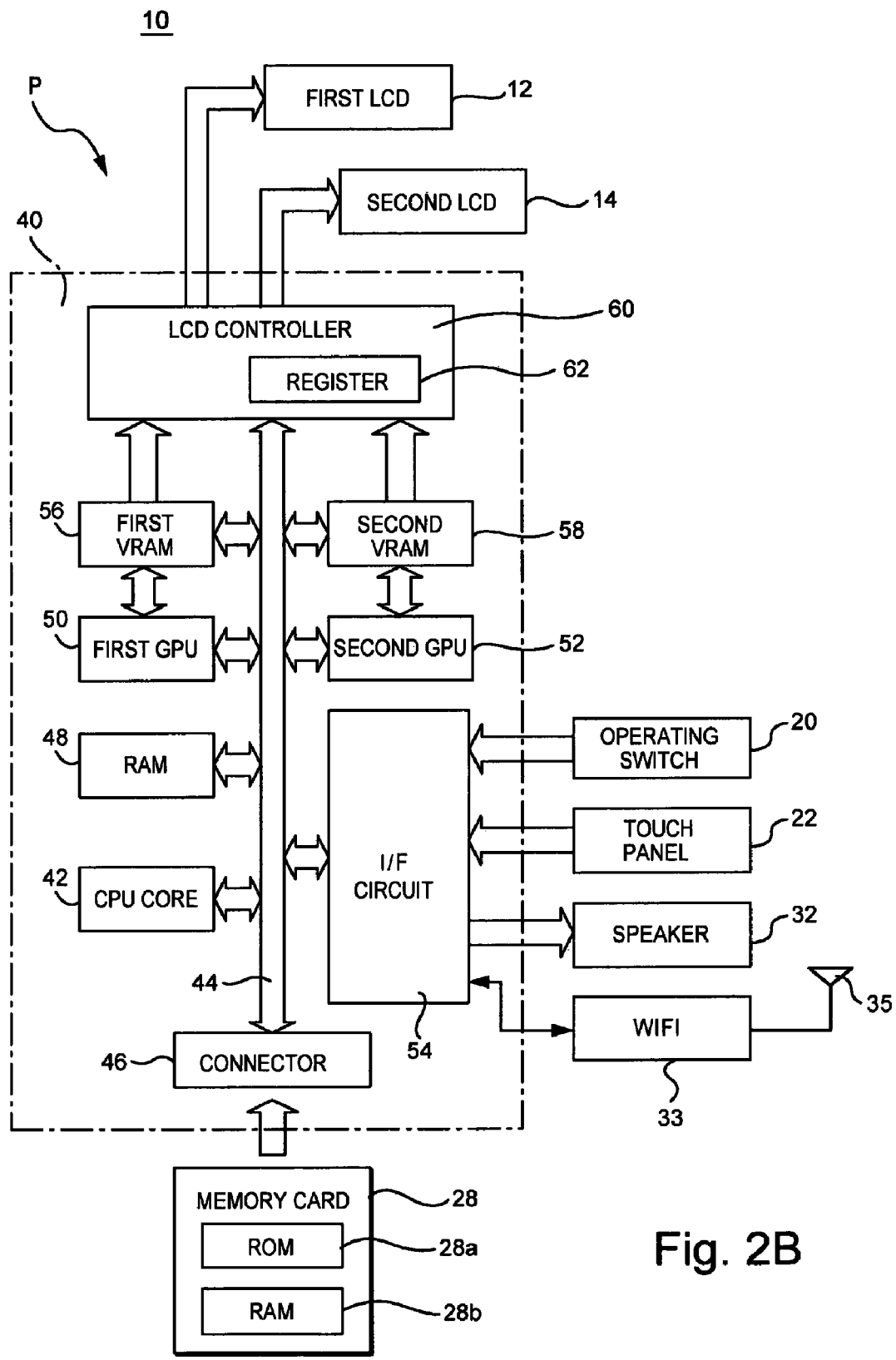
FIG. 2B is a block diagram showing an exemplary illustrative non-limiting electric configuration of the game device 10.

FIG. 2B is a block diagram showing an exemplary illustrative non-limiting electric configuration of the game device 10. Referring to FIG. 2B, the game device 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b. The ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a virtual game to be executed by the game device 10. ROM 28a may also store image data (character image, background image, item image, icon (button) image, message image, etc.), data representing sounds or music used to accompany the game (sound data), etc. The RAM (backup RAM) 28b stores (saves) proceeding data and result data of the game.

The RAM 48 is used as a buffer memory or a working memory. The CPU core 42 loads the game program, the image data, the sound data, etc. stored in the ROM 28a of the memory card 28 into the RAM 48, and executes the loaded game program. The CPU core 42 executes a game process while storing in the RAM 48 data (game data and flag data) temporarily generated in correspondence with progress of the game.

The game program, the image data, the sound data, etc. are loaded from the ROM 28a entirely at a time, or partially and sequentially so as to be stored (loaded) into the RAM 48.

Each of the GPU 50 and the GPU 52 forms a part of a rendering means. They may be provided by, for example, a single chip ASIC. GPU 50, 52 receive graphics commands from the CPU core 42 to generate game image data according to the graphics command. The CPU core 42 provides each of the GPU 50 and the GPU 52 with an image generating program (included in the game program) used to generate the game image data in addition to the graphics command.

GPU 50 is connected with a first video RAM (hereinafter, referred to as "VRAM") 56. GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. The CPU core 42 writes the image data required for graphics drawing into the first VRAM 56 and the second VRAM 58 via the GPU 50 and the GPU 52. The GPU 50 accesses the VRAM 56 to generate the game image data for graphics drawing. GPU 52 accesses the VRAM 58 to generate the game image data for graphics drawing.

The VRAM 56 and the VRAM 58 are connected to the LCD controller 60. The LCD controller 60 includes a register 62. Register 62 consists of, for example, one bit. Register 62 stores a value of "0" or "1" (data value) according to an instruction of the CPU core 42. When the data value of the register 62 is "0", the LCD controller 60 outputs the game image data generated by the GPU 50 to the LCD 12, and outputs the game image data generated by the GPU 52 to the LCD 14. When the data value of the register 62 is "1", the LCD controller 60 outputs the game image data generated by the GPU 50 to the LCD 14, and outputs the game image data generated by the GPU 52 to the LCD 12.

The LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22 and the speaker 32. Operating switch 20 is the above-described switches 20a, 20b, 20c, 20d, 20e, 20L and 20R. In response to an operation of the operating switch 20, a corresponding operation signal (operation data) is input to the CPU core 42 via the I/F circuit 54. The coordinates position data from the touch panel 22 is input to the CPU core 42 via the I/F circuit 54. The CPU core 42 reads-out the sound data necessary for the game such as a game music (BGM), a sound effect or voices of a game character (onomatopoeic sound), etc. from the RAM 48, and outputs it from the speaker 32 via the I/F circuit 54.

FIG. 2B further shows a "Wi-Fi" wireless adapter 33 and associated antenna 35. Wi-Fi wireless adapter 33 comprises a transceiver (transmitter and receiver) that allows gaming platform P to communicate wirelessly via network N. Wi-Fi wireless adapter 33 may comprise for example a baseband system, modulator and amplifiers compliant with the conventional 802.11 standard. Wi-Fi wireless adapter 33 wirelessly receives information transmitted over RF from other devices, and wirelessly sends information to other devices. Other wired or wireless technology (e.g., Ethernet, WAN, Bluetooth, etc.) could be substituted. Wireless adapter 33 allows gaming platform P to communicate with other gaming platforms or other devices in the same room or vicinity and/or with more remote devices. Network N could be a very localized network such as a 20-meter range WI-FI ad hoc connection, or it could be a worldwide network such as the Internet, or any other wired or wireless network you can think of.

Example Level Construction

Figure 3:
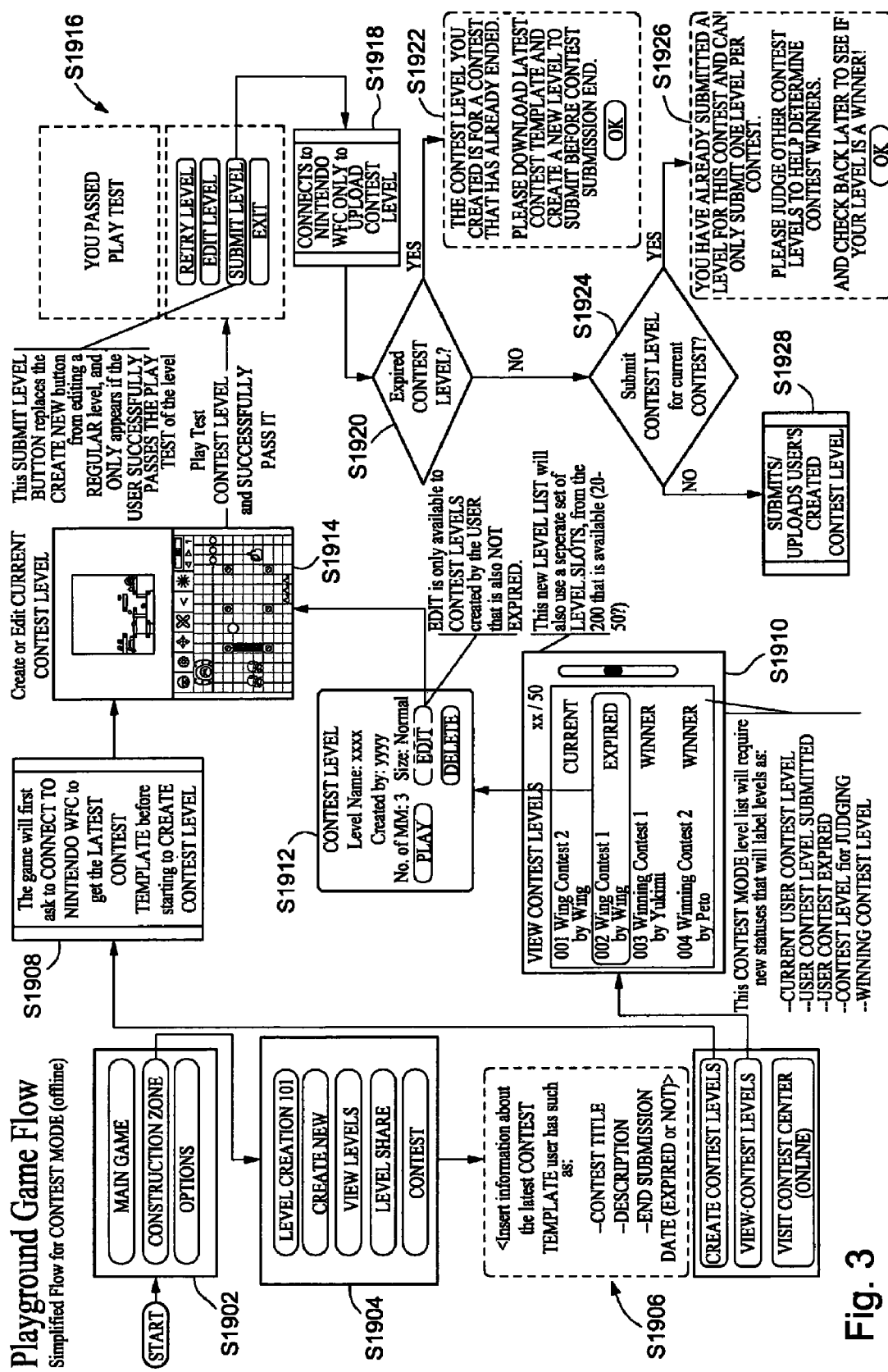
FIG. 3 shows an exemplary flow of a user driven contest conducted offline.

FIG. 3 shows an exemplary non-limiting implementation of a playground game flow for creating game levels and submitting a created game level for a contest mode. These actions may be taken offline except for the downloading of game templates and uploading of a created game level for a contest. In step S1902, the user selects the construction zone and in step S1904 contest is selected so that in step S1906 a suitable contest template is obtained for the user to create contest levels and view the created contest levels.

More particularly, in step S1906, selection of the create contest levels will first cause the user to be connected to network N in step S1908 to get the latest contest template before starting to create any contest levels. Thereafter in step S1914 the user is able to create or edit his own contest levels.

If in step S1906 the view contest levels selection is made then contest levels are displayed in step S1910. The status of the displayed contest levels is given as current, expired or winner. A selected contest level can be played, edited or deleted in step S1912. If the selected contest level is to be edited and has not expired the flow chart proceeds to step S1914 for editing of the selected and current contest level.

After the contest levels have been created or edited in step S1914 it is determined in a play test whether the contest level is playable. Levels can be constructed as described for example in U.S. patent application Ser. No. 13/160,305, entitled "Method and Apparatus for Constructing Virtual Sloped Landscapes in Computer Graphics and Animation," filed on date even herewith; U.S. patent application Ser. No. 13/160,372, entitled "Real-Time Terrain Animation Selection," filed on date even herewith; U.S. patent application Ser. No. 13/156,762, filed Jun. 9, 2011, entitled "Rivet Mechanisms"; and U.S. provisional application No. 61/497,011, entitled "Methods and/or Systems for Designing Virtual Environments"filed on date even herewith; all incorporated by reference. If the user successfully passes the play test of the level, then in step S1916 the user can retry the level, edit the level, submit the level, or exit. If the submit level button is activated in step S1916 the user is connected to Nintendo WFC to upload the contest level in step S1918.

In step S1920 it is determined whether the contest level has expired. If the answer is yes, the contest level ends and the user is instructed in step S1922 to download the latest contest template and create a new level to submit before contest submission ends. If the answer in step S1920 is no, then a further determination is made as to whether the contest level for a current contest has already been submitted in step S1924. If the answer is no, then the flow chart ends by submitting or uploading the user's created contest level in step S1928. If the answer in step S1924 is yes, then the user is notified in step S1926 that the contest level has already been submitted and only one contest level can be submitted per contest. The user is also instructed to judge other contest levels to help determine contest winners and to check back later to see if the user's contest level is a winner.

Example Online Contesting

Figure 4:
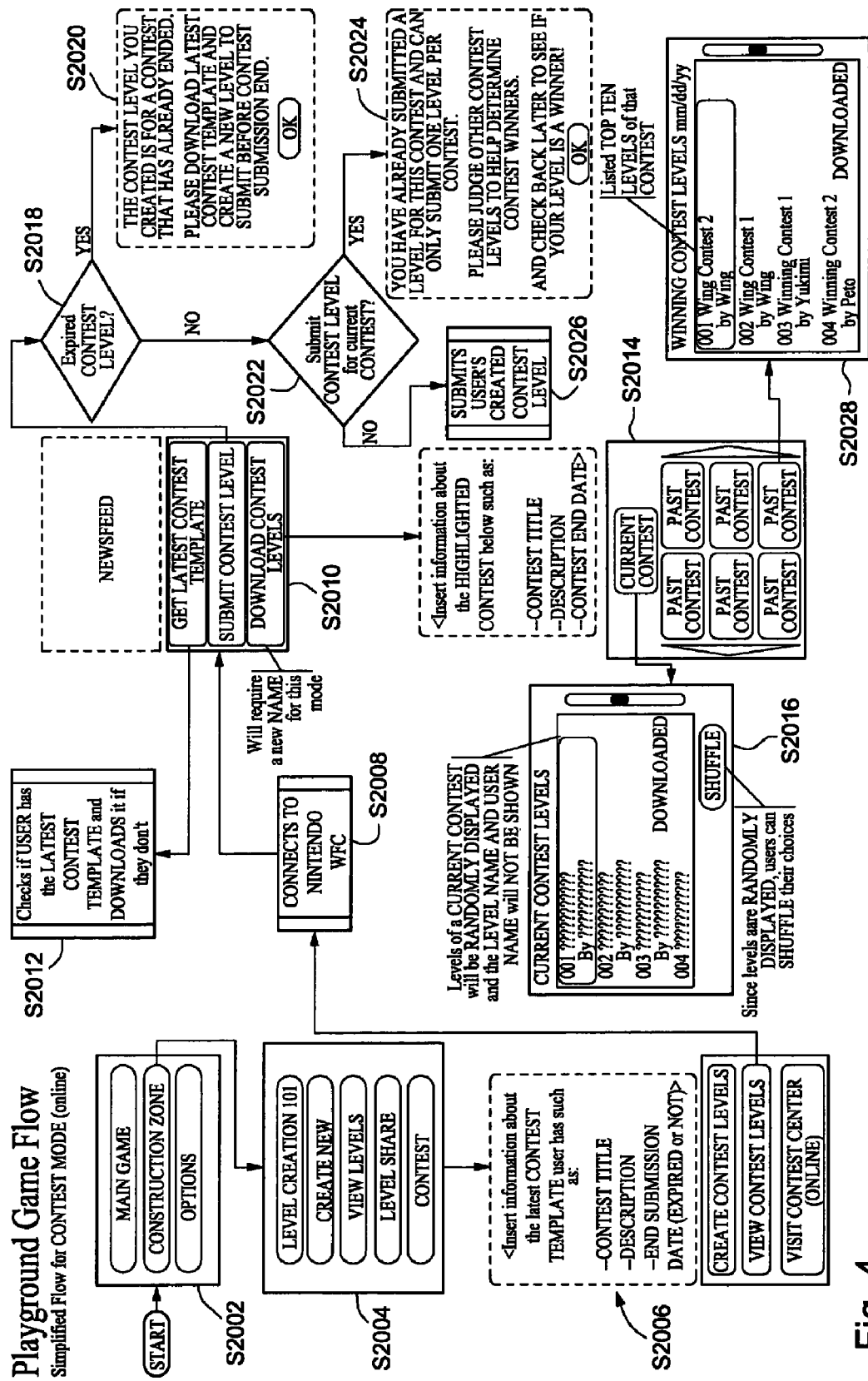
FIG. 4 shows an exemplary flow of a user driven contest conducted online.

FIG. 4 shows a playground game flow for a contest mode which is conducted online. In step S2002 if the construction zone is selected and in step S2004 if the contest level is selected, then the latest information about the latest contest template is provided to the user in step S2006.

If the view contest levels is selected in step S2006 then in step S2008 the user is connected to the Nintendo WFC.

In step S2010 the user submits a contest level, gets the latest contest template or downloads contest levels. In step S2012 it is checked if the user has the latest contest template and downloads it if the user does not. If the user downloads contest levels, then in step S2014 certain information is provided concerning the contest level including the contest title, description and end date.

In step S2016 the current contest levels are randomly displayed and in step S2028 the top ten levels of the past contests are displayed.

If the user submits a contest level in step S2010, then it is determined in step S2018 whether the contest level is expired. If the contest level is expired, then in step S2020 notification of that fact is provided to the user. If the contest level has not expired, then in step S2022 the user is asked whether the contest level for the current contest has been submitted. If the answer is no, then in step S2026 the user's created contest level is submitted. If the contest level has been previously submitted, however, then in step S2024 the user is notified that the level has already been submitted for the contest and only one level can be submitted per contest. The user is also instructed to judge other contest levels to help determine contest winners and to check back later to see if the level is a winner.

Figure 5:
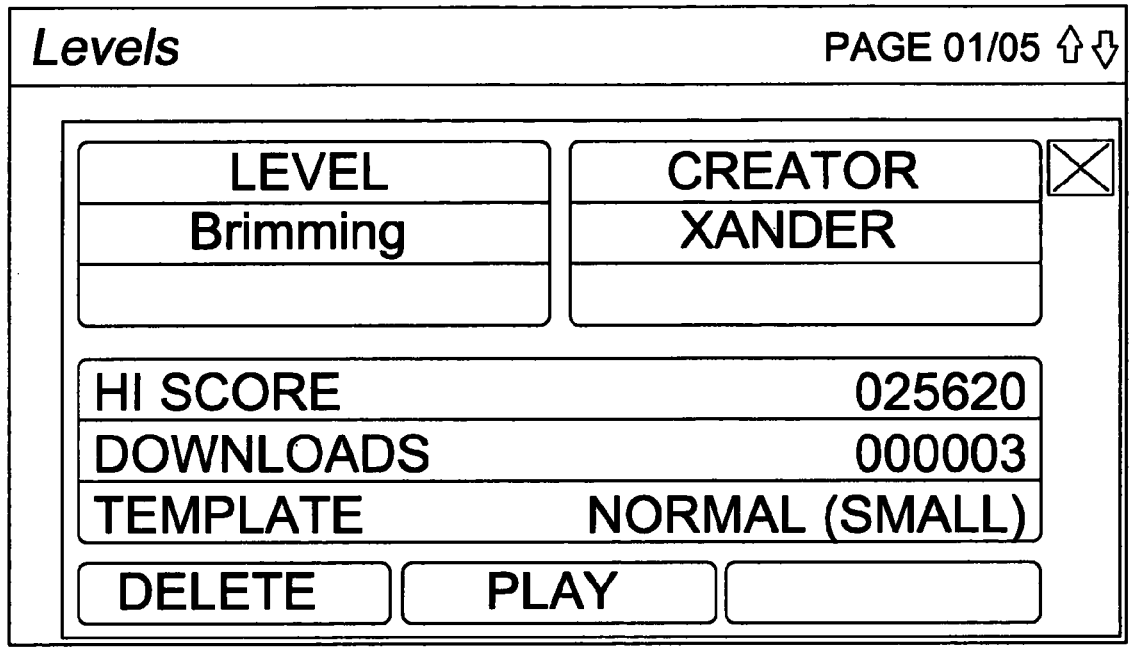
FIG. 5 shows a screen shot for a game level titled "Brimming" and created by Xander.

FIG. 5 is a screen shot of a contest level named "Brimming" that was created by Xander. The number of downloads and the high score for the Brimming level are provided together with an identification of the template used (000003) and other identifiers, i.e., normal and small. The screen shot includes activation buttons for delete and play of the level.

Figure 6:
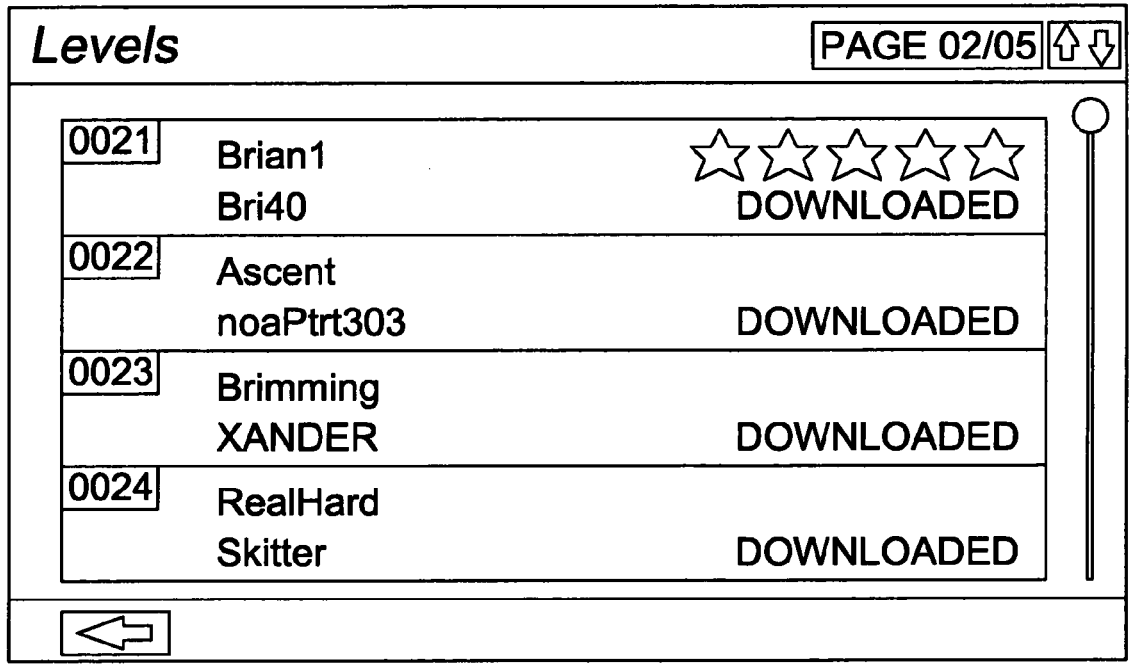
FIG. 6 shows a screen shot of downloaded created game levels.
Figure 7:
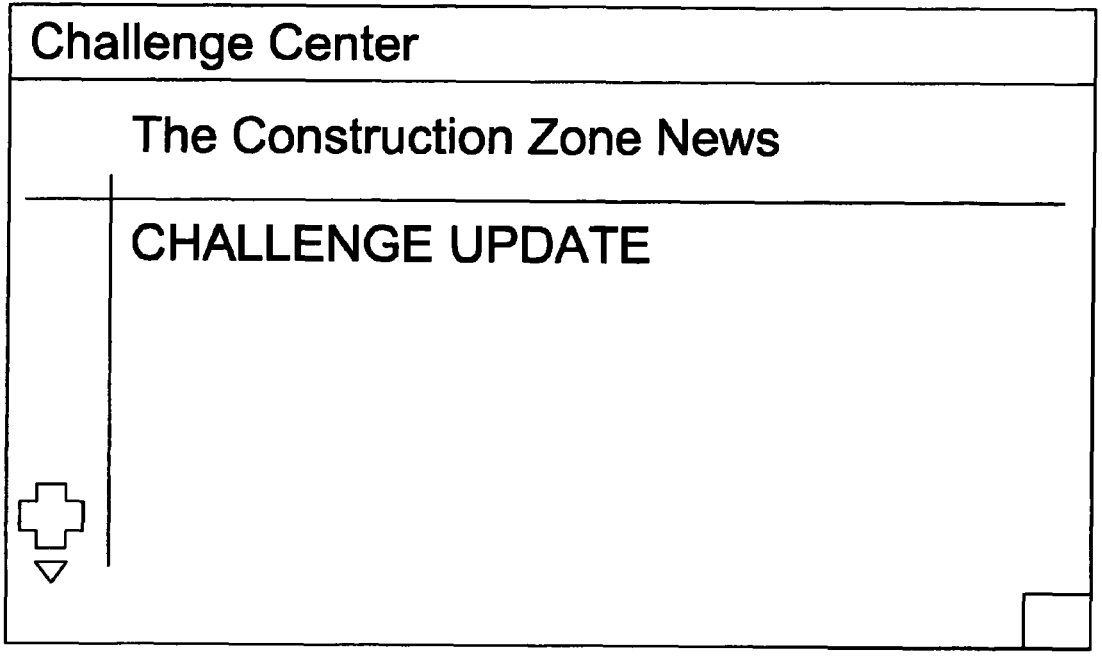
FIG. 7 shows a screen shot of the Challenge Center which provides Challenge Updates.
Figure 8:
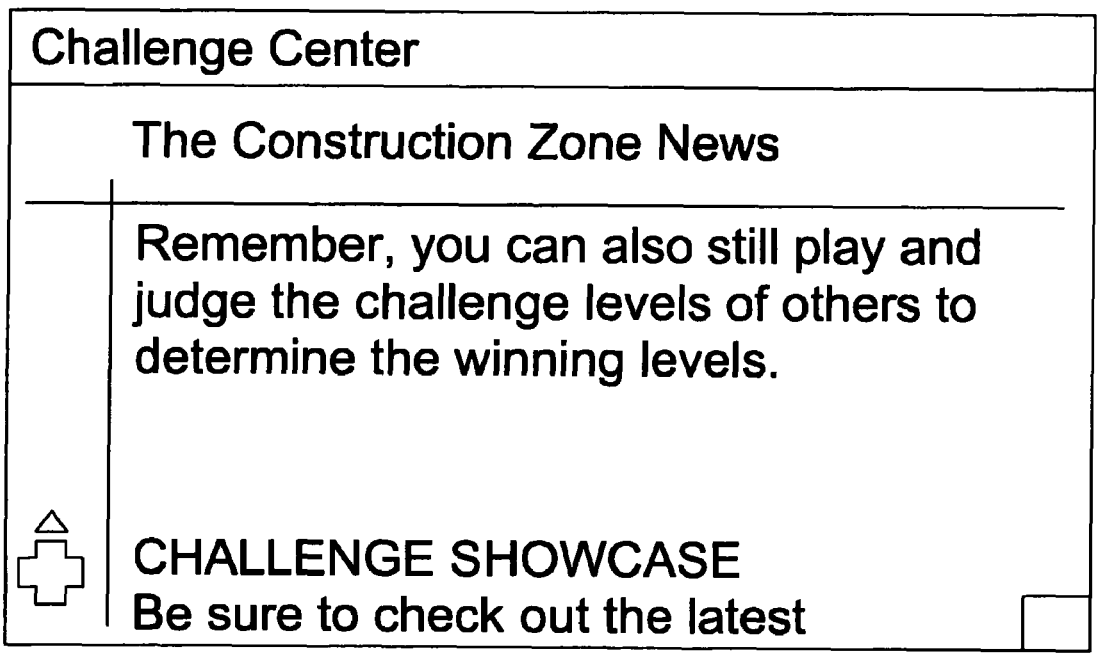
FIG. 8 shows another screen shot of the Challenge Center providing Challenge information.
Figure 9:
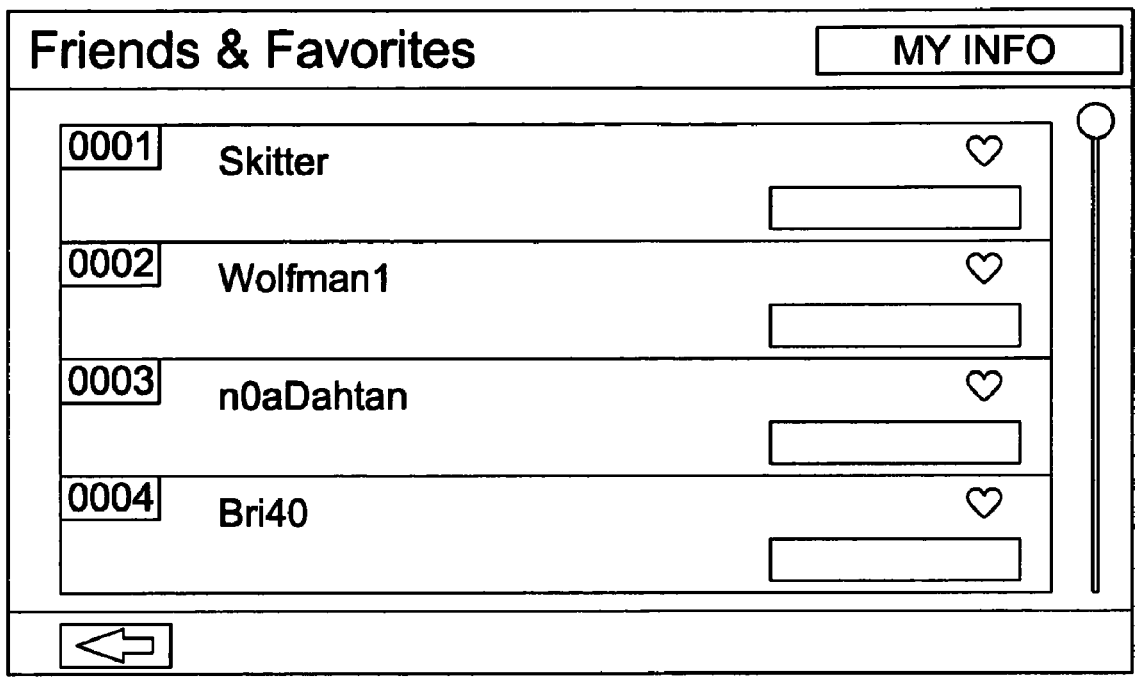
FIG. 9 shows a screen shot of a Friends & Favorites listing for sharing submitted game levels.
Figure 10:
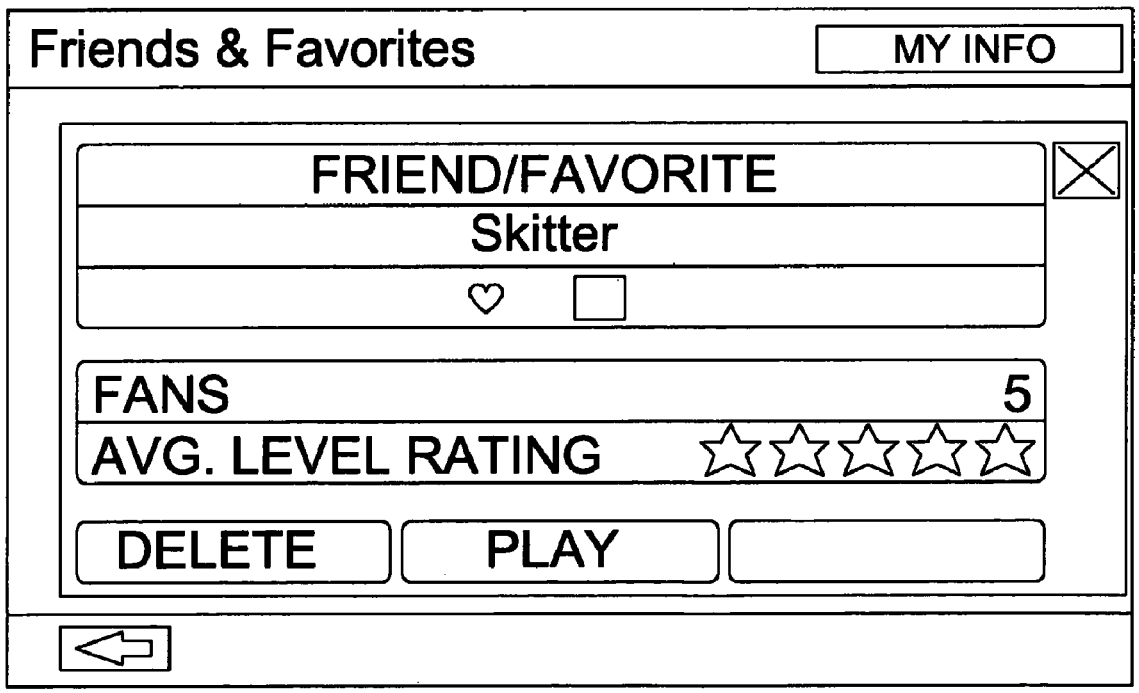
FIG. 10 shows a screen shot for a shared game level that has been judged by Skitter.

FIG. 6 is a screen shot of downloaded levels. FIGS. 7 and 8 show screen shots of the Challenge Center which respectively provide Challenge Updates and Construction Zone News. FIGS. 9 and 10 are screen shots showing the submission of levels to Friends & Favorites. More particularly, FIG. 9 shows the listing of Friends & Favorites that can be used for sharing created contest levels, and FIG. 10 shows a screen shot of contest level judged by Skitter.

While the technology herein has been described in connection with exemplary illustrative non-limiting implementations, the invention is not to be limited by the disclosure. For example, while exemplary illustrative non-limiting implementations have been described in connection with portable wireless video game platforms, any sort of appliance capable of being connected to a wired and/or wireless network may be used. The invention is intended to be defined by the claims and to cover all corresponding and equivalent arrangements whether or not specifically disclosed herein.

What is claimed:

1. A computer implemented method for creating a game, comprising:
   establishing a wireless connection for downloading a game template configured to allow play of a basic game to a user's personal device;
   allowing the user to create a new game by creating new game levels in the basic game using said downloaded template;
   providing for the user to view and/or edit the created new game;
   conducting a play test to determine playability of the created new game; and
   sharing the created new game with other users.

2. The method according to claim 1, wherein the created new game comprises at least one created level that is shared for play by other players.

3. The method according to claim 1, wherein the created new game complies with special content templates that the user must use to submit the created new game as a contest level for play and judging by other players.

4. The method according to claim 1, further comprising wirelessly delivering a tutorial on how to build game levels.

5. The method according to claim 4, wherein the tutorial includes practical hands on experience in building game levels.

6. A computer implemented method for creating a new level of a basic game, said method comprising:
   establishing a wireless connection for downloading a template for creating the new level of the basic game;
   allowing a user to create the new level of the basic game by using said downloaded template; and
   providing for the user to view and/or edit the created new level of the basic game.

7. The method according to claim 6, wherein the created new level complies with special content templates that the user must use to submit the created new level as a contest level for play by others.

8. A game system which in addition to game play allows a user to create a new level of a basic game, said system comprising:
   at least one processor programmed for:
   a) establishing a Wi-Fi connection for downloading a game template configured to allow play of the basic game;
   b) allowing the user to create the new level of the basic game by using said downloaded template;
   c) providing for the user to view and/or edit the created new level of the basic game; and
   d) conducting a play test to determine if the created new level of the basic game can be played; and
   a server for storing said game template that is wirelessly accessible by said at least one processor.

9. The game system as claimed in claim 8, said server further storing a tutorial on how to build game levels for download to said at least one processor.

10. The game system as claimed in claim 8, wherein the created level complies with special content templates that the user must use before uploading the created level to said server as a contest level for play and judging by other players.

* * * * *